United States Patent [19]

Inaba et al.

[11] 4,007,486
[45] Feb. 8, 1977

[54] PHASE LOCKING SYSTEM FOR TELEVISION SIGNALS USING A DIGITAL MEMORY TECHNIQUE

[75] Inventors: Masao Inaba; Atsumi Sugimoto; Mikio Shimizu; Masashi Onosato; Shigeru Miyahara; Kazuo Kashigi, all of Tokyo, Japan

[73] Assignee: Nippon Electric Co., Ltd., Tokyo, Japan

[22] Filed: Sept. 30, 1975

[21] Appl. No.: 618,276

[30] Foreign Application Priority Data

Oct. 5, 1974   Japan .......................... 49-115406
Oct. 15, 1974  Japan .......................... 49-119024

[52] U.S. Cl. .................................. 358/13; 358/8; 358/19
[51] Int. Cl.² ........................................ H04N 9/46
[58] Field of Search ............ 178/69.5 R, 69.5 DC, 178/69.5 CB; 325/58; 343/179; 358/8, 12, 13, 19, 21; 360/36, 9, 32, 33

[56] References Cited

UNITED STATES PATENTS

| 3,862,365 | 1/1975 | Kobayashi | 325/58 |
| 3,890,638 | 6/1975 | Bargen | 358/8 |
| 3,909,839 | 9/1975 | Inaba | 358/8 |

Primary Examiner—Howard W. Britton

[57] ABSTRACT

A phase locking system locks at least one incoming composite video signal to the synchronizing signals of a second, reference wave. The incoming signal is strobed at a rate dependent upon the incoming color subcarrier into a memory, essentially on a field-by-field basis. Circuitry is provided by grouping the fields on a repeating field-tagged basis (groups of four for the NTSC signal format) to maintain signal integrity.

13 Claims, 10 Drawing Figures

| FIELD NO. | HORIZONTAL SCANNING LINE (h) | SUBCARRIER CYCLE (SC) |
|---|---|---|
| 1st. | 262 (262.5 − 0.5) | 59605 ($\frac{455}{2} \times 262$) |
| 2nd. | 263 (262.5 + 0.5) | 59833 ($\frac{455}{2} \times 263 + 0.5$) |
| 3rd. | 262 (262.5 − 0.5) | 59605 ($\frac{455}{2} \times 262$) |
| 4th. | 263 (262.5 + 0.5) | 59832 ($\frac{455}{2} \times 263 − 0.5$) |

FIG. 1

| SERRATION TIMING-COINCIDENT WITH TIMING POSITION IN CB CYCLE $S_H$ | ODD | EVEN |
|---|---|---|
| FIRST HALF | 4th. FIELD ⌈1 1⌋ | 3rd FIELD ⌈1 0⌋ |
| LATTER HALF | 2nd FIELD ⌈0 1⌋ | 1st FIELD ⌈0 0⌋ |

| STORED FIELD | (1) | | | | (2) | | | | (3) | | | | (4) | | | |
|---|---|---|---|---|---|---|---|---|---|---|---|---|---|---|---|---|
| STORED FIELD | 1 | 2 | 3 | 4 | 2 | 3 | 4 | 1 | 3 | 4 | 1 | 2 | 4 | 1 | 2 | 3 |
| STORED FLAG SIGNAL ($W_2 W_0$) | 00 | 01 | 10 | 11 | 01 | 10 | 11 | 00 | 10 | 11 | 00 | 01 | 11 | 00 | 01 | 10 |
| REFERENCE FIELD | 1 | 2 | 3 | 4 | 1 | 2 | 3 | 4 | 1 | 2 | 3 | 4 | 1 | 2 | 3 | 4 |
| REFERENCE FLAG SIGNAL ($R_2 R_0$) | 00 | 01 | 10 | 11 | 00 | 01 | 10 | 11 | 00 | 01 | 10 | 11 | 00 | 01 | 10 | 11 |
| READ-OUT FLAG SIGNAL | 00 | 01 | 10 | 11 | 00 | 11 | 10 | 01 | 10 | 11 | 00 | 01 | 10 | 01 | 00 | 11 |
| JUMPED ADDRESSES (NUMBER OF ADDRESSES) | | | | | 228~455 (228) | 228~454 (227) | | | | | | | 228~454 (227) | 228~455 (228) | | |
| READ-OUT ADDRESSES (NUMBER OF ADDRESSES) | 0~59604 (59605) | 0~59832 (59833) | 0~59604 (59605) | 0~59831 (59833) | 0~227 456~59832 (59605) | 0~227 455~59831 (59605) | 0~59832 (59833) | 0~59604 (59605) | 0~59832 (59833) | 0~59604 (59605) | 0~59831 (59832) | 0~227 455~59831 (59605) | 0~59832 (59833) | 0~227 456~59832 (59605) | 0~59831 (59832) |

PHASE LOCKING SYSTEM FOR TELEVISION SIGNALS USING A DIGITAL MEMORY TECHNIQUE

This invention relates to a phase locking system for television signals, and, more particularly, to such a phase locking system capable of phase locking a composite video signal differing in phase and frequency from a reference signal.

In a conventional multi-station TV broadcasting system as shown in U.S. Pat. No. 3,862,365 entitled "SYNCHRONIZING SYSTEM FOR A PLURALITY OF SIGNAL TRANSMITTERS USING OSCILLATORS OF HIGH FREQUENCY STABILITY," composite video signals are transmitted from local stations to a center station where the respective video signals are phase-compared with a composite video signal of the center station to provide respective phase difference signals. These phase difference signals are fed back to the respective local stations, e.g., through ordinary telephone lines, to compensate for the phase differences of the signals from the local stations. However, in such a conventional multi-station system, a readjustment of the delay time compensation is required when any one of the transmission lines is switched.

On the other hand, U.S. Pat. No. 3,909,839 entitled "A PHASE LOCKING SYSTEM FOR TELEVISION SIGNALS USING DIGITAL MEMORY TECHNIQUES," and an article titled "Television Frame Synchronizer" published in the Journal of the SMPTE (Society of Motion Picture and Television Engineers), Vol. 84, No. 3 (March 1975), 129–134, describe a television frame synchronizing system, in which the video signal from a local station is coded and then stored in a large capacity memory capable of storing the signal on a frame-by-frame basis. The stored signal is read out by using read-out pulses synchronized with the synchronizing signal of the center station. This system requires a memory of great capacity, making the system more expensive as a whole.

It is therefore an object of the invention to provide an improved phase locking system for television signals without resorting to such a large capacity memory.

In television systems such as the NTSC, PAL and SECAM systems used in the present television broadcasting, an interlace scanning system is adopted. In the NTSC system, for example, 30 pictures are transmitted per second, and a frame representing one picture consists of two, odd- and even-numbered fields, differing by one half of one horizontal scanning line with respect to the scanning position. The above-mentioned conventional system uses a digital memory of a capacity large enough to store one frame.

Efforts have been made to reduce the capacity required of the memory. Assume that the memory capacity is made to correspond to one field which is half of one frame. Then, if the field stored is odd and the read-out field is even, this will give rise to a problem because the phase of the synchronizing signal for the odd field differs from that for the even field by half (½ H) of one horizontal scanning period (1H). The color-subcarrier frequency is determined set to be 455/2 times the horizontal scanning frequency, and the number of horizontal scanning lines is prescribed to be 525. Therefore, the number of cycles of the color-subcarrier wave falling in one frame is 119,437.5. Because the color-subcarrier phase of the first frame is opposite to that of the second frame, the sytsem does not function satisfactorily if the color subcarrier phase for the frame stored in the memory differs from that for the frame read out of the memory.

According to the invention intended to solve this problem encountered in a one-field memory, the NTSC system video signal is stored therein by a unit of four fields in sequence. When the present system is applied to a PAL system video signal based on the ¼ H offset and frame-offset, the video signal is stored in the 1-field memory by a unit of eight fields in sequence. Similarly, a SECAM system video signal is stored by the unit of 8 fields.

The features and advantages of this invention will be understood from the following detailed description of preferred embodiments thereof, taken in conjunction with the accompanying drawings, wherein:

FIG. 1 is a table illustrating the principle of the present invention;

Figure 2:
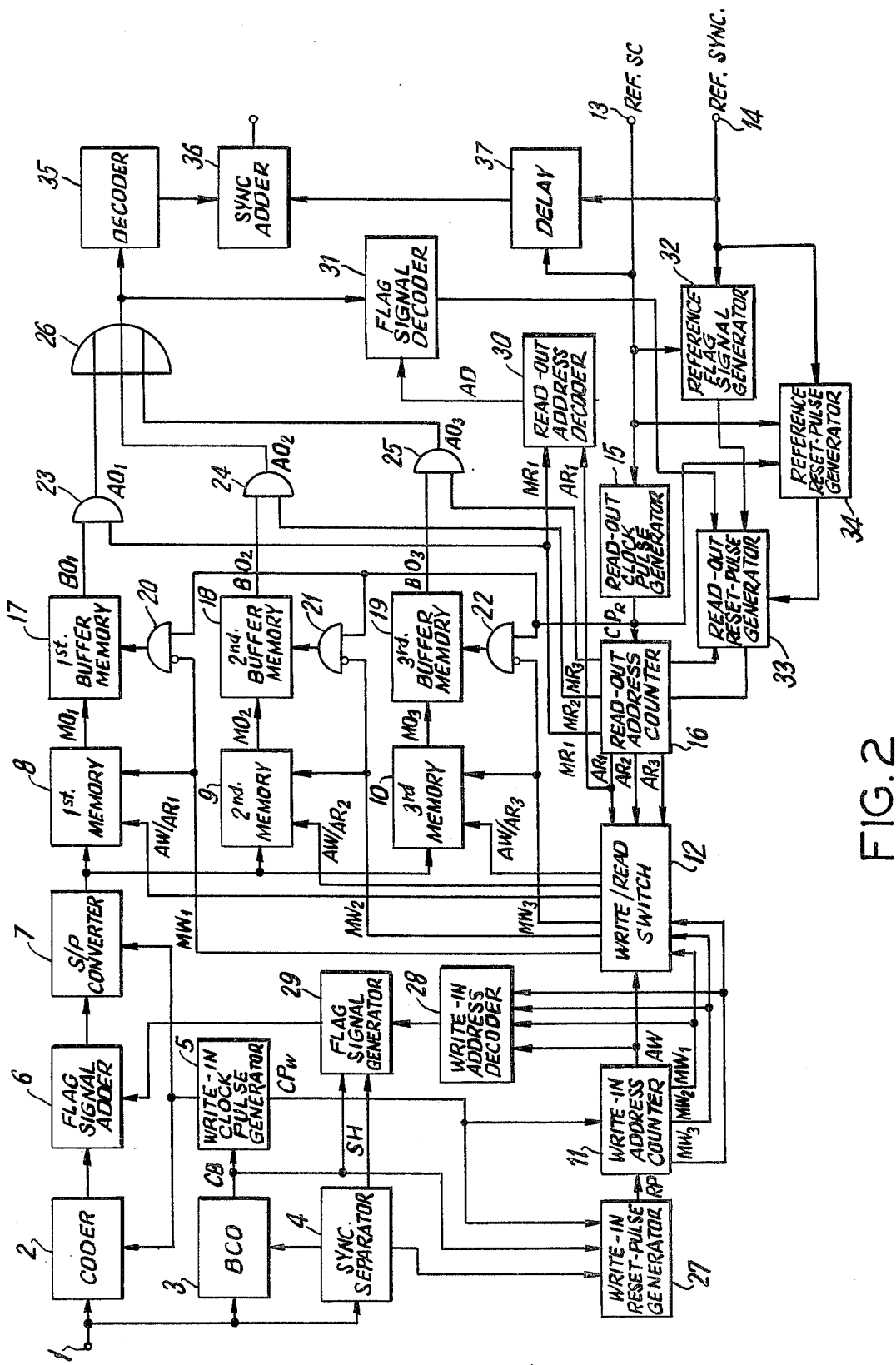
FIG. 2 is a block diagram of a first embodiment of the invention.
Figure 3A:
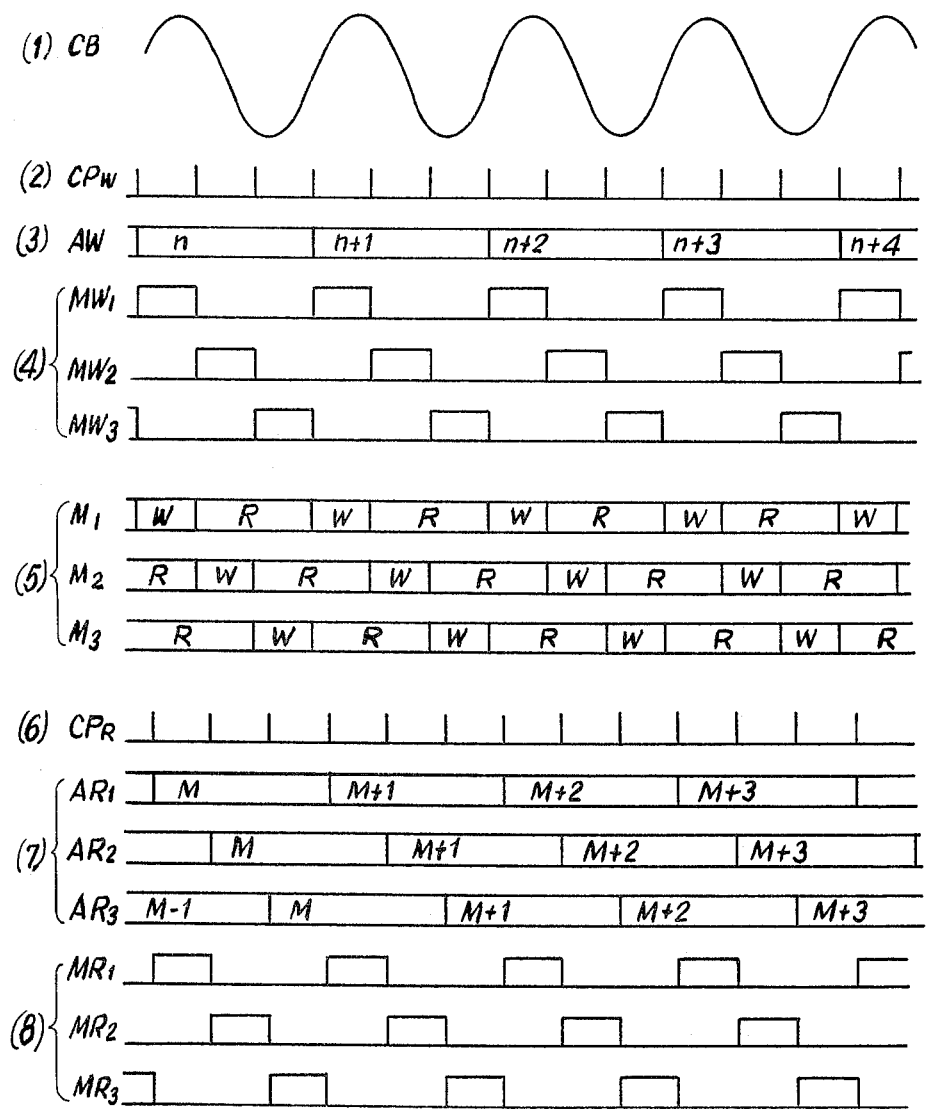
Figure 4:
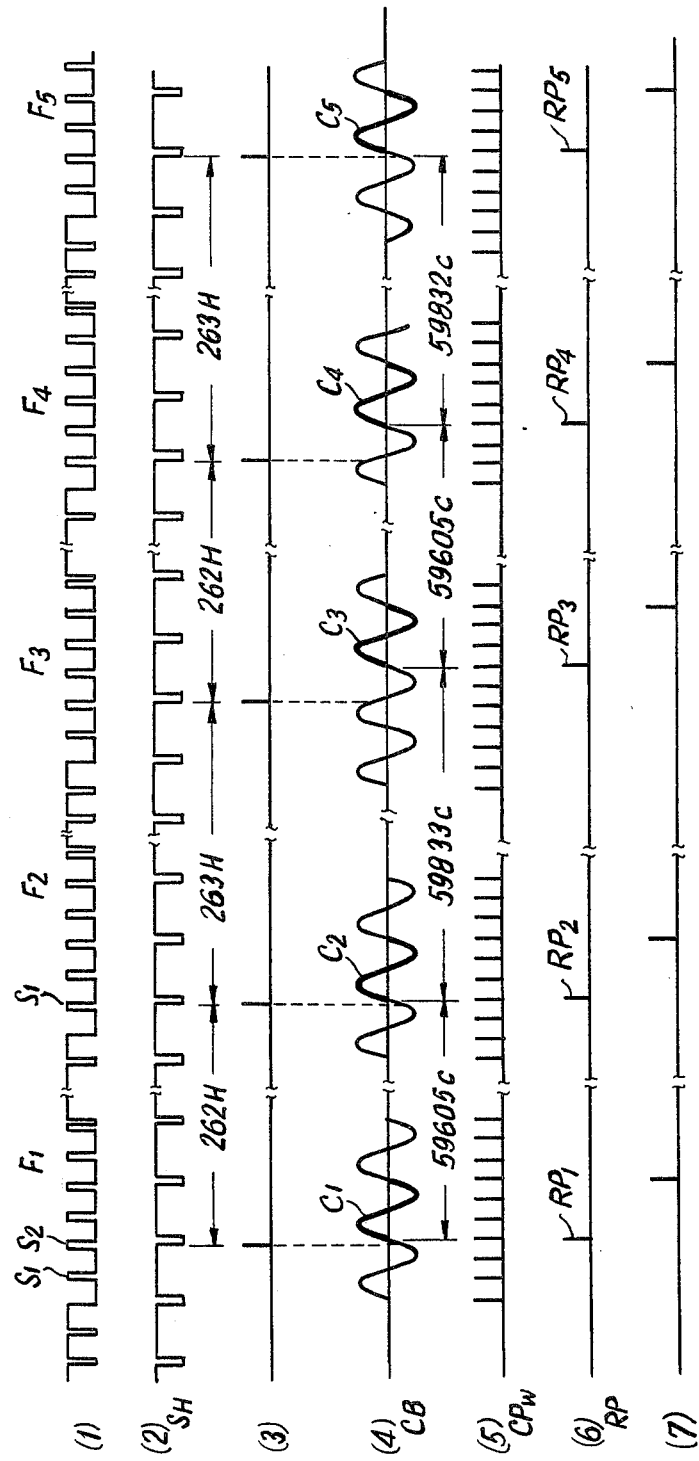
Figures 6, 7:
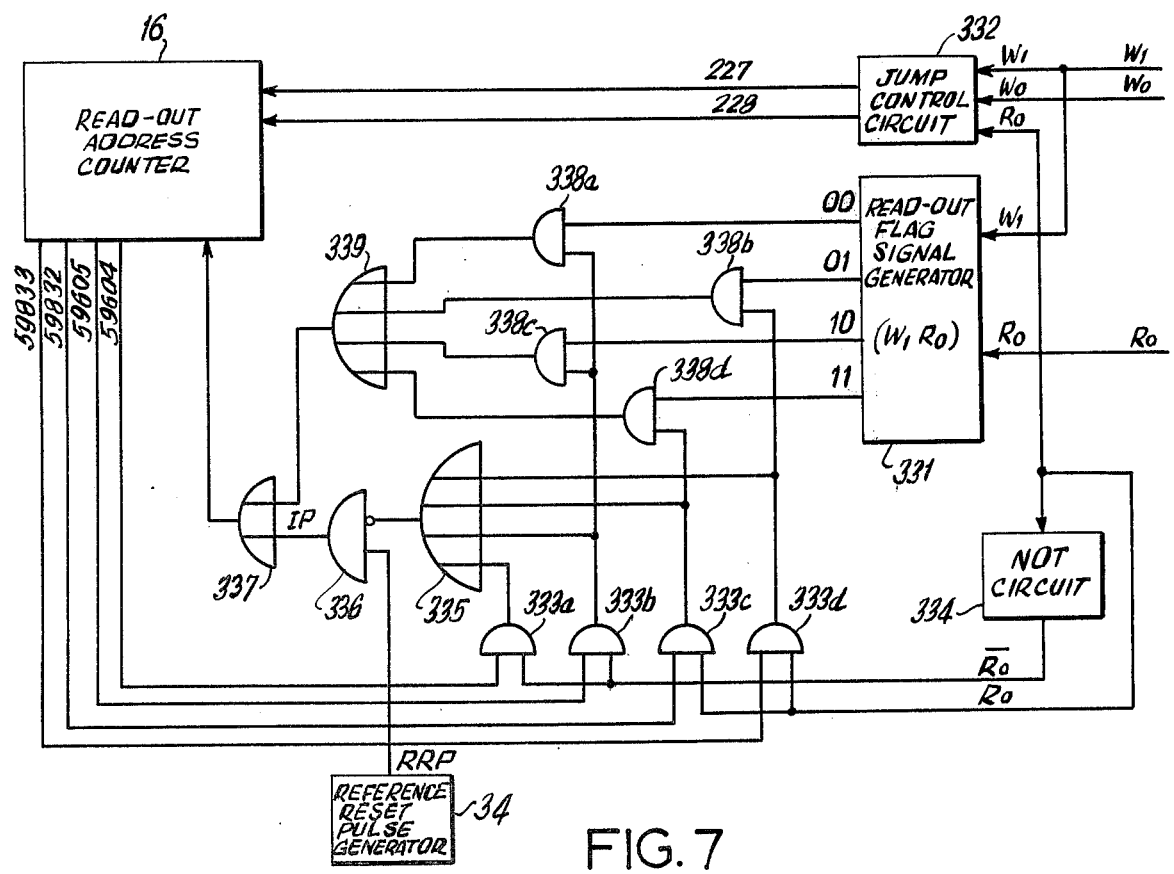
Figure 8:
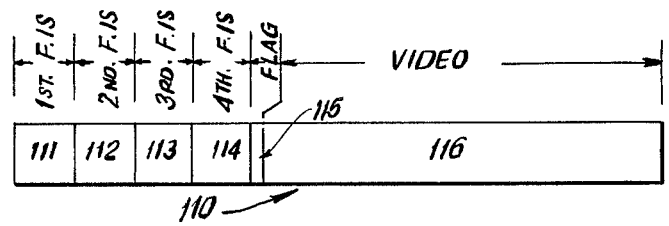
Figure 9:
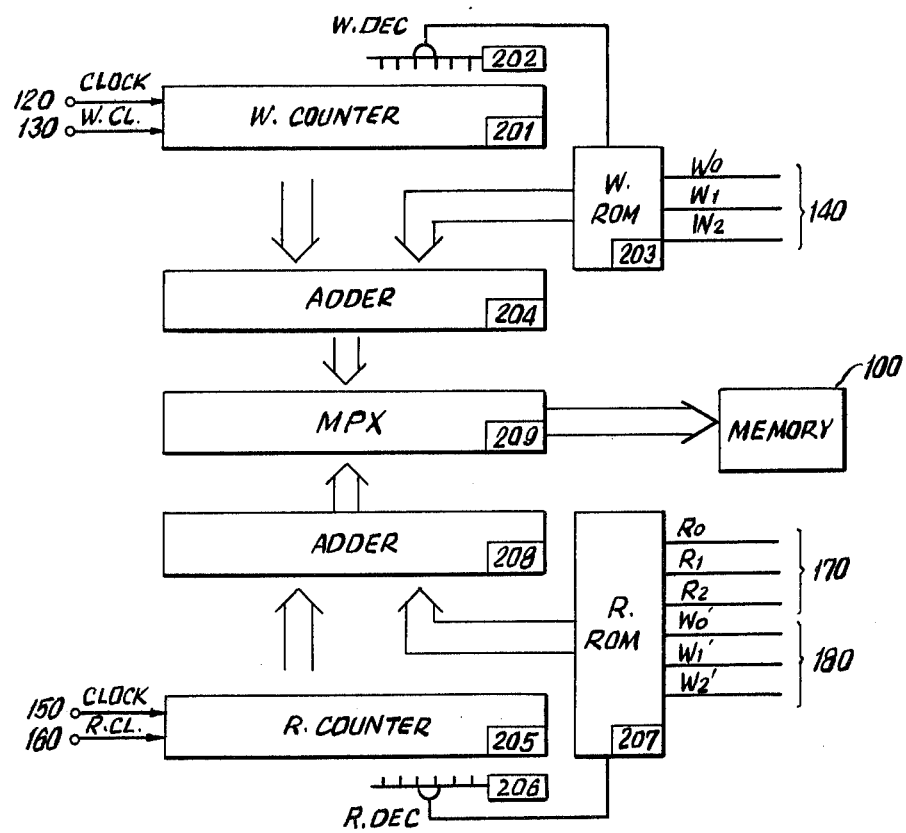

FIGS. 3(A) and 3(B) are diagrams showing the operation of the first embodiment shown in FIG. 2;

FIG. 4 is a waveform diagram illustrating the operation of a reset pulse generator in the first embodiment;

FIG. 5 is a table illustrating the operation of a flag signal generator in the first embodiment;

FIG. 6 is a diagram showing the relationship between the stored field and the reference field, in connection with a method of read-out control;

FIG. 7 is a block diagram showing circuits attendant a read-out reset pulse generator;

FIG. 8 is a diagram showing the memory construction of a second embodiment of the invention; and FIG. 9 is a block diagram of the memory control portion of the second embodiment.

As shown in FIG. 1 depicting the relationships obtaining between the field, the number of horizontal scanning lines and the number of subcarrier cycles, for the first field, there is stored for an NTSC system video signal corresponding to 59605 ($=455/2 \times 262$) cycles of the color-subcarrier wave extenting over 262 horizontal scanning lines (H); in the second field, a video signal corresponding to 59,833 ($=455/2 \times 263 + 0.5$) cycles of the color subcarrier wave covering 263 horizontal lines is stored; in the third field, a video signal corresponding to 59,605 cycles of the color subcarrier wave covering 262 horizontal scanning lines is stored; and in the fourth field, a video signal corresponding to 598,32 ($=455/2 \times 263 - 0.5$) cycles of the color subcarrier wave covering 263 horizontal scanning lines is stored.

Referring to FIG. 2, the present system shown therein is supplied at an input terminal 1 with an input composite video signal from a local station. From the terminal 1, the video signal is supplied to a coder 2, a burst controlled oscillator (BCO) 3 and a sync separator 4. The BCO 3 is also supplied with a synchronizing signal separated at the sync separator 4. The BCO 3 generates a continuous wave CB of a color subcarrier frequency (about 3.58 MHz in the case of the NTSC system) synchronized with a colour burst signal contained in the input composite video signal. The subcarrier CB from the BCO 3 is supplied to a clock pulse generator 5 to produce a write-in clock pulse $CP_w$ of about 10.7 MHz (3.58 MHz $\times$ 3). The clock pulse $CP_w$ is supplied to the coder 2, which encodes the input video signal into a time-serial 8-bit digital video signal having a clock frequency of 10.7 MHz. The coder 2 may be of the feed-back type described in an article entitled "A feed-back type coder for CTV" (Paper No. 1581 of the Proceedings of the National Convention of the Institute of Electronics and Communication Engineers of Japan in 1971).

The digital video signal from the coder 2 is then supplied to a flag signal adder 6, in which a 2-bit flag signal representing the number of accumulated picture elements, as will be specifically described below, is added to the 8-bit video signal during the vertical blanking period in each field. This digital video signal is supplied to a serial-parallel converter 7 which effects a serial-to-parallel code conversion. The time-parallel digital video signal is stored in a first memory 8, a second memory 9 and a third memory 10 in sequence in the manner below described.

The write-in clock pulse $CP_w$ from the clock pulse generator 5 is supplied also to a write-in address register (counter) 11. The address data from the write-in address register 11 consists of first address data AW representing an address in each memory, and second address data $MW_1$, $MW_2$ and $MW_3$ identifying one of the three memories 8, 9, or 10. As shown in FIG. 3 (3), first address signal AW represents an address such as the address "0", the address "1", . . . , in memory, which is available at the rate of 10.7/3 MHz. As shown in FIG. 3 (4), the second address signals $MW_1$, $MW_2$ and $MW_3$ are pulse trains, respectively, of 10.7/3 MHz repetition rate, with phases 120° offset from each other. These address signals are supplied to the memories 8, 9 and 10 through a write/read switch 12, whereby the time-parallel digital video signal from the serial-to-parallel converter 7 is written in a repeating sequence into the memories 8, 9, 10, 8, 9, . . . . The write-in address register 11, when written in full, will self-clear.

The write/read switch 12 controls the supply of address data for writing and reading to the memories so that write-in (W) and read-out (R) of the memories 8, 9 and 10 occur with the timing shown in FIG. 3 (5). When a writing is supplied to the first memory 8 ($M_1$) and thus this memory is in the write-in state (W), the other memories 9 and 10 are kept in the read-out state (R). During the next clock interval, write-in address data is supplied to the second memory 9 ($M_2$) which is in the write-in state, the other memories 10 and 8 being in a read-out state. During the next clock interval, write-in address data is supplied to the third memory 10 ($M_3$), the memory 10 being in a write-in state and the other memories 8 and 9 being in a read-out state.

The reference subcarrier incoming at an REF SC terminal 13 is supplied to a read-out clock pulse generator 15 for generating a read-out clock pulse $CP_R$ (FIG. 3(6)) of 10.7 MHz, which is applied to a read-out address register (counter) 16. The read-out address register 16 generates first read-out address data $AR_1$, $AR_2$ and $AR_3$ as in FIG. 3 (7) representing the read-out addresses in the memories 8, 9 and 10, and second read-out address data $MR_1$, $MR_2$ and $MR_3$ as in FIG. 3 (8) identifying one of the three memories 8, 9 or 10. The first address data is supplied to the memories 8, 9 and 10 through the write/read switch 12, causing data stored at the designated address to appear at the output terminals of the individual memories.

As shown in FIG. 3 (9), data to be written (indicated as n, n+1, . . . ; where n, n+1, . . . , represent write-in data to be stored in the addresses "n," "n + 1," . . . ,) appears at the output terminal of a memory when the memory is in the write-in state. Read-out data (indicated as M, M + 1, . . , where M, M + 1, . . . is data to be read out of the addresses "M," "M + 1, ". . . .,) appears at the output terminal of a memory when this memory is in the read-out state.

Because differences obtain between the local and central stations, the write-in clock pulse differs from the read-out clock pulse in frequency and/or phase. It is therefore almost impossible to read out data at the arbitrary timing of the read-out clock pulses. To adjust these write and reading timings, buffer memories 17, 18 and 19 are connected to the memories 8, 9 and 10 respectively. Output data $MO_1$, $MO_2$ and $MO_3$ from the memories 8, 9 and 10 is transferred to the buffer memories 17, 18 and 19, respectively, by the read-out clock pulse $CP_R$ from the read-out clock pulse generator 15. Inhibit circuits 20, 21 and 22 are provided to inhibit the data transfer when the memories 8, 9 and 10 are in the write-in state. The inhibit circuits 20, 21 and 22 respectively inhibit the read-out clock pulse $CP_R$ responsive to the second write-in address signals $MW_1$, $MW_2$ and $MW_3$, and generates transfer pulses $T_1$, $T_2$ and $T_3$ as in FIG. 3 (10). These transfer pulses cause transfer of the output data $MO_1$, $MO_2$ and $MO_3$ to the buffer memories 17, 18 and 19, respectively, giving rise to buffer memory output data signals $BO_1$, $BO_2$ and $BO_3$ as in FIG. 3 (11) at the output terminals of the individual buffer memories 17, 18 and 19. These buffer memory output data signals are supplied to AND gates 23, 24 and 25 in which they undergo gate-enabling coincidence logic with the second read-out address signals $MR_1$, $MR_2$ and $MR_3$, respectively. The signals $MR_1$, $MR_2$, and $MR_3$ dictate the order of the read-out, whereby output data signals $AO_1$, $AO_2$ and $AO_3$ are obtained, as shown in FIG. 3 (12). These output data signals are supplied to an OR gate 26. Thus, an 8-bit digital video signal of clock frequency 10.7 MHz synchronized with the reference signal is obtained.

In the phase locking system of the invention, as described previously, video signals corresponding to 59,605, 59,833, 59,605 and 59,832 cycles of the color subcarrier are stored in sequence in a memories by the four field unit. To control this operation, a write-in reset pulse generator 27 is provided which generates reset pulses RP upon receipt of the color subcarrier signal CB from the burst-controlled oscillator 3, the composite synchronizing signal from the sync separator 4, and the write-in clock pulse $CP_w$ from the write-in clock pulse generator 5. The generator 27 provides as the reset pulse RP a first clock pulse in the first cycle of the color subcarrier appearing immediately after the horizontal synchronizing signal and the vertical synchronizing signal serration are coincident with each other for the first time. As shown in FIG. 4 (1), 4 (2) and 4 (3), the second serration $S_2$ of the vertical synchronizing signal and the horizontal synchronizing signal $S_H$ occur at the same timing in the odd fields $F_1$, $F_3$, $F_5$, . . . , and the first serration $S_1$ of vertical synchronizing signal and the horizontal synchronizing signal $S_H$ occur at the same timing in the even fields $F_2$, $F_4$, $F_6$, . . . ,.

The reset pulses RP ($RP_1$, $RP_2$, $RP_3$, . . . ) occur with the first clock pulses of the first cycles C ($C_1$, $C_2$, $C_3$, . . . ) of the color subcarrier appearing immediately after a timing coincidence is reached between the serrations of vertical synchronizing signals and the horizontal synchronizing signals. The reset pulses RP are supplied to the write address register 11 and used to reset the write-in address data to zero address. Therefore, in the first field $F_1$, the video signal is stored in sequence beginning with zero address for the period of 59,605 ($32\ 455/2 \times 262$) cycles of the color subcarrier after the write-in address register 11 is reset by the first reset pulse $RP_1$. At the end of this period, the second reset pulse $RP_2$ is generated. The write-in address register 11 is reset by the reset pulse $RP_2$, and the video information of the second field is stored in a sequence starting from zero address. Thus, the third reset pulse $RP_3$ is generated after the period of 59,833 ($= 455/2 \times 263 + 0.5$) cycles of color subcarrier. The write-in address register 11 is again reset by the reset pulse $RP_3$, and the video signal of the third $F_3$ is stored in the memory in sequence from zero address. The fourth reset pulse $RP_4$ is generated after the period of 59,605 cycles of color subcarrier from the time at which the third pulse $RP_3$ has been generated. As a result, the write-in address register 11 is reset and the video signal of the fourth field $F_4$ is stored in the memory in sequence from zero address. At the end of the period of 59,832 ($= 455/2 \times 263 - 0.5$) cycles of color subcarrier after the fourth reset pulse $RP_4$, the fifth reset pulse $RP_5$ is generated. As apparent from FIG. 4, the fifth reset pulse is the same as the first reset pulse $RP_1$ with regard to the timing relationship between the color subcarrier $CP_w$, the horizontal synchronizing signal $S_H$ and the vertical synchronizing signal serration. Thus, in this the manner above-described, such operation is repeated in a unit of four fields.

The write-in address data signals AW, $MW_1$, $MW_2$ and $MW_3$ are supplied to a write-in address decoder 28. The write-in address decoder 28 generates a pulse signalling that the write-in address register 11 is reset and that the write-in address is cleared to zero address. This pulse is supplied to a flag signal generator 29. The flag signal generator is supplied also with the color subcarrier CB from the burst-controlled oscillator 3 and the composite synchronizing signal from the sync separator 4 to generate a 2-bit flag signal indentifying, which field of the four is to be stored. This operation is based on the timing coincidence between the horizontal synchronizing signal $S_H$ and the vertical synchronizing signal serration, as well as on the phase relationship between this timing coincidence and the color subcarrier CB.

More specifically, as shown in FIG. 5, the flag signal generator 29 generates the flag signal "00" identifying that the field to be stored is the first one. This occurs when the second serration $S_2$ of vertical synchronizing signal is coincident with the horizontal synchronizing signal $S_H$, during the latter half of one cycle of the color subcarrier CB. When the timing coincidence is between the first serration $S_1$ of vertical synchronization and the horizontal synchronizing signal $S_H$, and such timing exists in the latter half of one cycle of the color subcarrier CB, the flag signal generator 29 generates the flag signal "01" signalling that second field is to be stored timing is coincident. When the timing is coincident second serration $S_2$ of vertical synchronizing signal is coincident with the horizontal synchronizing signal $S_H$, during the first half of one cycle of the color subcarrier CB, the flag signal generator generates the flag signal "10" identifying the field to be stored as the third one. When the timing is coincident between the first serration $S_1$ of vertical synchronzing signal and the horizontal synchronizing signal $S_H$, and such timing exists in the first half of one cycle of the color subcarrier CB, the flag signal generator 29 generates the flag signal "11" signalling that the field to be stored is the fourth one.

The flag signal generated in the above-described manner is supplied to the flag signal adder 6 in which the flag signal is added to the 8-bit time-serial digital video signal supplied from the coder 2. The flag signal is obtained at each reset pulse RP, which is generated immediately after the first or second serration of the vertical synchronizing signal of the composite television signal. More specifically, the flag signal is obtained when the composite television signal stands at its lowest level. For the period of 0.46 H after the reset pulse RP, the most significant digits of the 8-bit digital video are logical "0." Hence, for example, the two most significant digits of the 8-bit digital video signal corresponding to the clock pulses (FIG. 4 (7)) generated within one cycle of color subcarrier CB after the reset pulse RP, is of logical "0" as long as no noise is present. A flag signal is inserted in the place of these most significant digits. The digital video signal with the flag signal inserted is stored in the memory through the serial/parallel converter 7, whereby the flag signal is stored in the upper two bit places of the address "1" in the first memory.

During read-out, the read-out address data $AR_1$ and $MR_1$ are supplied from the read-out address register 16 to a read-out address decoder 30. The read-out address decoder 30 generates an address-decoding pulse AD when the first read-out address data signal $AR_1$ represents the address "2," and the second read-out memory-identifying address data $MR_1$ is a logical "1." The address decoding pulse AD is supplied to a flag signal decoder 31. The flag signal decoder 31 is supplied also with the read-out PCM signal from the OR gate 26. The read-out PCM signal has been delayed behind the reference synchronizing signal by one cycle of color subcarrier CB (i.e., by three clock pulses $CP_R$), as clearly understood from FIGS. 3 (7), 3 (8) and 3 (12). In other words, the read-out digital video signal obtained when the read-out address data $AR_1$ signals the address "2" is the data stored at the address "1" in the memory. Hence, by gating the two most significant digits of the read-out PCM signal by the address decoding pulse AD, the stored flag signal can be read out.

The reference color subcarrier and the reference synchronizing signal are supplied through input terminals 13 and 14 to a reference flag signal generator 32 whereby a reference flag signal is generated. As shown in FIG. 6, there are four possible relationships between the stored flag signal and the reference flag signal, i.e., between the field stored in the memory and the reference field.

1. The field stored is the same as the reference field, (FIG. 6 (1));
2. The reference field lags behind the stored field by one field, (FIG. 6 (2));
3. The reference field is behind the stored field by two fields, (FIG. 6 (3));
4. The reference field is behind the stored field by three fields, (FIG. 6 (4)).

In this embodiment, the read-out field is determined in the following manner. The even or odd read-out field depends on the even or odd reference field. In other words, the lower digit ($R_0$) of the reference flag signal is adopted as the lower digit of the read-out flag signal.

The upper digit ($W_1$) of the stored signal is adopted as the upper digit of the read-out flag signal. Thus, the read-out flag signal may be expressed as "$W_1R_0$." The relationship between the stored flag signal and the reference flag signal is shown in FIG. 6. In case the even/odd relationship between the stored field and the reference field disagree as shown in FIGS. 6 (2) and 6 (4), when the stored fields are of the second and fourth fields, the addresses to be read out must be jumped by about 0.5 H. To this effect, in this embodiment, the read out is performed in the relationship shown in FIG. 6.

A read-out reset pulse generator 33 and a reference reset pulse generator 34 are provided in order to maintain read-out in the relationship shown in FIG. 6. The read-out reset pulse generator 33 is shown in detail in FIG. 7, in which the upper and lower digits of the stored flag signal are represented by $W_1$ and $W_0$, respectively, and the lower digit of the reference flag signal by $R_0$. The read-out reset pulse generator 33 comprises a read-out flag signal generator 331 for producing the read-out flag signal ($W_1R_0$) from the lower digit $R_0$ of the reference flag signal and the upper digit $W_1$ of the stored flag signal; and a jump control circuit 332 for producing a signal representing the number of addresses to be jumped, depending upon the stored flag signal ($W_1W_0$) and the lower digit $R_0$ of the reference flag signal. The read-out reset pulse generator 331 generates output signals of logical "1" at the output terminals corresponding to the read-out flag signals. The jump control circuit 332 generates a jump signal 227 at a terminal 227 when $R_0$ is a logical "0" and the stored flag signal is "11," or a jump signal 228 at a terminal 228 when $R_0$ is logical "0" and the stored flag signal is "01." The jump signals 227 and 228 are supplied to the read-out address counter 16, causing the read-out address to jump from the address "228" to "455" and "456," respectively, when the read-out goes to the address 227.

The read-out reset pulse generator 33 comprises four AND gates 333a, 333b, 333c and 333d, to which are respectively supplied the counter pulses generated after 59,604, 59,605, 59,832 and 59,833 cycles of color subcarrier, from the time the read-out address counter 16 is reset. The AND gates 333a and 333b are supplied with $R_0$ (as $\overline{R}_0$) through an inverter circuit 334, and the AND gates 333c and 333d are supplied with $R_0$. Thus, when the reference field is odd (i.e., $R_0$ is of logical "0", or $\overline{R}_0$ is "1"), the AND gates 333a and 333b are in their open, enabled state. When the reference field is even ($\overline{R}_0$ is of logical "1"), the AND gates 333c and 333d are in the open state. The outputs of the AND gates 333a to 333d are supplied to the inhibit terminal of an inhibit gate 336, through an OR circuit 335, to inhibit the reference reset pulse supplied from the reference reset pulse generator 34. The reference reset pulse generator 34, upon receipt of the reference synchronizing signal, reference color subcarrier and read-out reset pulse, generates a reference reset pulse at each frame. That is, the reference reset pulse generator 34 generates as a read-out reset pulse the first read-out clock pulse in the first cycle of the color subcarrier appearing immediately after the timing coincidence between the first or second serration of vertical synchronizing signal and the horizontal synchronizing signal.

At the start of the read-out, no counter pulse is generated from the read-out address counter 16, and therefore the inhibit circuit 336 does not inhibit the reference reset pulse from the reference reset pulse generator 34. As a result, the reference reset pulse is supplied to the read-out address counter 16 through the inhibit gate 336 and an OR gate 337, thereby resetting the read-out address counter 16. Consequently the read-out address data returns to zero address, and the stored data is read out in sequence from zero address in the memory. As described above, because the flag signal is stored in the address "1" of the first memory 8, the stored flag signal is available immediately after the read-out address counter 16 has been reset. The flag signal is supplied to the read-out flag signal generator 331 and the jump control circuit 332. The read-out flag signal generator 331 has its "00," "01," "10" and "11" output terminals connected to input terminals of the AND gates 338a, 338b, 338c and 338d. The other input terminals of the AND gates 338a and 338c are connected to the output terminal of the AND gate 333b; the other input terminal of the AND gate 338b, to the output terminal of the AND gate 333d; and the other input terminal of the AND gate 338d, to the output terminal of the AND gate 333c. The output signals of the AND gates 338a to 338d are supplied to the read-out address counter 16 by way of OR gates 339 and 337. When the system is in normal operation, the reference reset pulse is inhibited and hence the output signal of the OR gate 339 is supplied at the read-out reset pulse to the read-out address counter 16. The jump control circuit 332 supplies the read-out address counter 16 with the jump signals 227 and 228 when $R_0$ is "0" and the stored flag signal is "11" and "01," respectively.

Thus the read-out reset pulse generator 33 performs control for normal read-out operation as in FIG. 5. More specifically as shown in FIG. 6 (1), the jump control circuit 332 does not operate when coincidence exists between the stored flag signal and the reference flag signal and in consequence the stored flag signal is neither "01" nor "11" as long as $R_0$ is "0". As a result, the data stored in the addresses "0" to "59,604" (corresponding respectively to 59,605 cycles of color subcarrier) are read out in the first field which is the reference field; the data in addresses "0" to "59,832" are read out in the second field; and the data in addresses "0" to "59,604" and "0" to "59,831" are read out in the third and fourth fields, respectively.

When the reference flag signal is behind the stored flag signal by one field (i.e., when the even/odd relationship between the stored field and the read-out field disagree), as shown in FIG. 6 (2), $R_0$ is "0" and the stored flag signal is "01" in the first field which is the reference field and hence a jump signal 228 appears at the terminal 228 of the jump control circuit 332. In the third field, $R_0$ is "0" and the stored flag signal is "11", and hence a jump signal 227 appears at the terminal 227 of the jump control circuit 332. Thus jump, or address advancement, of the read-out address counter 16 is controlled. As a result, in the first field which is the reference field, the read address data is jumped over 228 addresses from the address 227 to 456 whereby the data in the addresses from "0" to "227" and in the addresses from "456" to "59,832" ( or the data in a total of 59,605 addresses) are read out. In the second field, the data in the addresses from "0" to "59,831" are read out, and in the third field, the data in the addresses from "0" to "227" and from "455" to "59,831", with a jump from the addresses "227" to "455" by the read-out address data, or the data in a total of 59,605 addresses, are read out. In the fourth field, the data in the addresses from "0" to "59,832" are read out.

When the reference flag signal is behind the stored flag signal by two fields as shown in FIG. 6 (3), the stored flag signal is neither "01" nor "11" as long as $R_0$ is "0" and hence the jump control circuit 332 remains inoperative. Therefore the data in the addresses from "0" to "59,604" are read out in the first field, the data in the addresses from "0" to "59,832" are read out in the second field, the data in the addresses from "0" to "59,604" are read out in the third field, and the data in the addresses from "0" to "59,831" are read out in the fourth field.

When the reference flag signal is behind the stored flag signal by three field (i.e., when the even/odd relationship between the stored field and the reference field disagree) as shown in FIG. 6 (4), $R_0$ is "0" and the stored flag signal is "11" in the first field and hence a jump signal 227 appears at the terminal 227 of the jump control circuit 332, while in the third field, $R_0$ is "0" and the stored flag signal is "01" and hence a jump signal 228 appears at the terminal 228 of the jump control circuit 332 whereby jump of the read-out address counter 16 is controlled. As a result, in the first field which is the reference field, the read-out address data skips over 227 addresses from "227" to "455" to "59,831" (or the data in a total of 59,605 addresses) are read out. In the second field, the data in the addresses from "0" to "59,832" are read out, and in the third field, the read-out address data is jumped over 228 addresses from "227" to "456", and thus the data in the addresses from "0" to "227" and from "456" to "59,832" (or the data in a total of 59,605 addresses) are read out. In the fourth field, the data in the addresses from "0" to "59,831" are read out.

The 8-bit digitalized video signal read out in the manner as described above is supplied from the OR gate 26 to the decoder 35 in which the digitalized video signal is converted into an analog video signal, which is supplied to a synchronizing signal adder 36 and thereby given a correct synchronizing signal. As described previously, the video signal which has been read out is behind the reference signal by one cycle of the reference color subcarrier. To adjust this delay, the reference synchronizing signal is delayed by one cycle of the reference color subcarrier by a delay circuit 37. The resultant signal is supplied to the synchronizing signal adder 36, for providing a composite video signal synchronized with the reference signal (although this video signal is behind the reference signal by one cycle of the color subcarrier).

In broadcasting, there are instances in which the following signals are superposed during the vertical blanking period.

For example, in England;
| | |
|---|---|
| Line 16: | International identification and control signals |
| Line 329: | International identification and control signals |
| Lines 17 and 18: | International test signals |
| Lines 330 and 331: | International test signals |
| Lines 19 and 20: | Domestic test signals |
| Lines 332 and 333: | Domestic test signals |
| In Japan (Commercial Broadcasting): | |
| Line 16: | Identification and control signals (Net-Q) |
| Line 279: | Identification and control signals (Net-Q) |

-continued
| | |
|---|---|
| Lines 17 and 18: | Test signals |
| Lines 280 and 281: | Test signals |

Signal standards applied to the test signal vary by line number, and hence the test signal differs in even and odd fields. If coincidence is not reached between the two fields as shown in FIGS. 6 (2) and 6 (4), the test signal which should be in the odd field appears in the even field or vice versa.

In Japan, the identification signal and the control signal change every field and repeat a constant state every two fields. Many countries outside Japan employ a method in which the two signals repeat every two fields. As a result, in a case where the identification signal and the control signal are written in and read out of the memory in a field cycle, it is very likely that the same field is repeatedly read at an instant where read-out exceeds write-in, or one field is discarded at the instant write-in exceeds read-out. In other words, the regularity of two-field cycle is detrioated and the significance of identification and control is harmed. To solve this problem, a modification can be adopted in which the memory means is divided into a plurality of first memory sections for storing signals superposed during vertical blanking, and a second memory section for storing video signals other than the superposed signals.

Referring to FIG. 8 which shows a memory construction of memory means in a second embodiment adapted to the PAL system, memory means 110 consists of six parts 111, 112, . . . and 116. The first part 111 stores first field-insertion signals such as test, identification and control signals (hereinafter collectively deemed FIS signals in brief) superposed during the vertical blanking period of the first field. Similarly, the second, third and fourth parts 112, 113 and 114 store second, third and fourth FIS signals for the second, third and fourth fields, respectively. The sixth part 116 stores the input television signal other than vertical blanking period. The fifth part 115 is for storing a flag signal of 3 bits representing which field of the video signal is to be stored in the sixth part 116.

As is well-known, the PAL system color television signal is such that the color subcarrier is ¼ line-offset and frame-offset. Therefore, a constant state is repeated every 8-field cycle. In other words, the field of the PAL system color television signal is expressed by the combination of the following states, which may be represented by the a 3-bit flag signal;
1. Even/odd parity of field;
2. Color signal polarity (corresponding to PAL color switching);
3. Even/odd parity of subcarrier.

The FIS signals in the odd field is stored in the first and third parts 111 and 113 of the memory means 110, and the FIS signals in the even field are stored in the second and fourth parts 112 and 114. For read-out, therefore, the FIS signals are read out of the first part 111 in the first field of the reference field. Similarly, the FIS signals are read out of the second, third and fourth parts 112, 113 and 114 in the second, third and fourth fields, respectively. In this manner, the normal even-/odd parity of FIS signals is maintained.

An example of memory address control for the above write-in and read-out control will be described by referring to FIG. 9. A write-in clock pulse and a write-in reset pulse are supplied to terminals 120 and 130, respectively, whereby a write-in address counter 201 is operated. In the first embodiment adapted to the NTSC system, the amount of video signals stored in the memory is changed by a 4-field unit, and, in the PAL system, by a 8-field unit. This control is made by the write-in reset pulse.

The output data of the write-in address counter 201 is supplied to an adder 204 in which this data is added to the data from a read-only memory 203. The output write-in address data from the adder 204 is supplied to the memory means 100 through an address multiplexer 209. The read-only memory 203 receives from a terminal 140 the 3-bit flag signal representing one of the fields of 8-field cycle, and generates FIS address data corresponding to the address "0" in the first part 111 of the memory means 110 in the first and fifth fields, the address "0" in the second part 112 in the second and sixth fields, the address "0" in the third part 113 in the third and seventh fields, and the address "0" in fourth part in the fourth and eighth fields. These FIS address data signals are supplied to adder 204. In the second embodiment having the memory construction shown in FIG. 3, the video signal during vertical blanking, excepting the FIS signals, are not stored in the memory means 100. Hence, the FIS address data is transferred from the read-only memory 203 to the adder 204, and the write-in address counter 201 starts counting at the beginning of FIS signals.

In the first and fifth fields, the FIS address data corresponding to the address "0" is supplied from the read-only memory 203 to the adder 204, to cause the write-in address counter 201 to start counting at the beginning of FIS signals. As a result, the write-in address data from the adder 204 is counted from the address "0". Assuming that the number of memory addresses corresponding to picture elements of FIS signals is $n$, the FIS signals are stored in $n$ addresses (from "0" to "$n-1$"), i.e., in the first part 111. In the second and sixth fields, the FIS address data corresponding to the first address (address "0") in the second part 112 of the memory means 110, i.e., the address "$n$" in the memory means 110, is supplied from the read-only memory 203 to the adder 204, to cause the write-in address counter 201 to start counting at the beginning of FIS signals. Thus, the write-in address data from the adder 204 is counted from the address "$n$," and the FIS signals are stored in the second part 112 which is from the address "$n$" to the address "$2n-1$" in the memory means 110. Similarly, in the third and seventh fields, and in the fourth and eighth fields, the FIS address data corresponding to the addresses "$2n$" and "$3n$" of the memory means 110 are supplied to the adder 204, to cause the write-in address counter 201 to start counting from the address "0" at the beginning of FIS signals. Therefore, the write-in address data from the adder 204 are counted from the addresses "$2n$" and "$3n$," respectively. Thus, the FIS signals are stored in the third part 113, i.e., in the addresses from "$2n$" to "$3n-1$" in the memory means 110, and in the fourth part 114, i.e., in the addresses from "$3n$" to "$4n-1$" in the memory means 110.

A write-in decoder 202 generates a pulse when the write-in address counter 201 has counted FIS address data corresponding to the number of picture elements after its start of counting at the beginning of FIS signals, or has counted data corresponding to $n$ addresses. This pulse is supplied to the read-only memory 203, which in turn generates address data corresponding to the first address in the fourth part, i.e., the address "$3n$," irrespective of the state of the write-in flag signal $W_0$, $W_1$, $W_2$. This address data is supplied to the adder 204. At this moment, the counted data from the write-in address counter 201 has a value corresponding to the address "$n$," and hence the write-in address data from the adder 204 corresponds to the address "$4n$," i.e., the first address (address "0") in the fifth part 115 of the memory means 110. After this, therefore, the write-in flag signal and the television signal which follows the write-in flag signal are stored in the memory.

In the read-out operation, a read-out clock pulse and a read-out reset pulse are supplied from terminals 150 and 160 to a read-out address counter 204, which thereby starts counting. The output data of the read-out address counter 205 is supplied to an adder 208 which adds this data information from a read-only memory 207. The resultant information is supplied to an address multiplexer 209. The read-out address counter 205 and the adder 208 are identical to the write-in address counter 201 and the adder 294 in construction.

The read-only memory 207 receives from a terminal 170 a reference flag signal $R_0 R_1 R_2$ which is obtained against the read-out reference signal. The read-only memory 207 thereby generates addend data for the read-out of the FIS signals, and performs read-out switching from the FIS signals to the flag signal and to the television signal according to the pulse from a read-out decoder 206 which is identical to the write-in decoder 202. The read-only memory 297 performs the function of modifying the address by determining the read-out field after comparing the stored flag signal $W_0' W_1' W_2'$ with the reference flag signal $R_0 R_1 R_2$. This operation is done before the television signal stored in the sixth part 116 of the memory means 110 is read out. This address modification is not necessary when even/odd coincidence exists between the write-in field and the reference field, but is necessary when no even/odd coincidence exists therebetween. In the latter case, the read-out phase must be offset with respect to the write-in phase by an amount corresponding to one of a scanning line. For this purpose, the read-only memory 207 generates a nonmodifying signal or plural kinds of ½H modifying data (i.e., data corresponding to the number of picture elements of ½H) according to the combination of the stored flag digit $W_0'$ and the reference flag digit $R_0$ (both digits being of even/odd parity of field). The non-modifying signal or ½H modifying data is supplied to the adder 208.

While the second embodiment where the invention is applied to the PAL system has been described, it is apparent that the invention is similarly applicable to other television systems.

In the second embodiment, the FIS signals which differ in the even and odd fields can be read out without distortion and for correct fields, in spite of the fact that the memory means has a capacity corresponding to only about one field.

The above described arrangement is merely illustrative of the principles of the present invention. Numerous modifications and adaptations thereof will be readily apparent to those skilled in the art without departing from the spirit and scope of the present invention.

What is claimed is:

1. A phase locking system for a composite video signal having first synchronizing signals including horizontal and vertical synchronizing signals and a color sub-carrier, said composite, video signal having successive frames each including two fields obtained by interlaced scanning, said frame being defined by said horizontal and vertical synchronizing signals, said first synchronizing signals having predetermined first phase relationships therebetween, said phase relationships differing from one field to another for at least every two adjacent fields, said phase locking system comprising;

means for producing first clock pulses having a predetermined phase relationship with said first synchronizing signals;

means for encoding, in timed relationship with said first clock pulse, said composite video signal into a digitalized video signal;

memory means having plural parts for storing said digitalized video signal in response to said first clock pulses, said memory means having a capacity for storing substantially one-field long portion of said digitalized video signal;

means for controlling said memory means such that said digitalized video signal is stored in a part of said memory means while other parts thereof are in an idle state allowing read-out of stored digitalized video signal, said controlling means including first addressing means for successively allotting said digitalized video signal to a plurality of said parts of said memory means, and first resetting means for resetting the state of said first addressing means to a predetermined initial condition once every field, the timing of said first resetting being changed in response to said first phase-relationship in each field;

a source of a reference signal having second synchronizing signals including reference horizontal and vertical synchronizing signals and a reference color subcarrier, said second synchronizing signals as a generality being out of synchronism with said first synchronizing signals;

means for producing second clock pulses having a preset phase relationship with said second synchronizing signals; and means for reading out, in timed relationsip with said second clock pulses, the stored digitalized video signal from said part of said memory means being in said idle state.

2. A phase locking system as claimed in claim 1 further comprising a plurality of buffer memories connected to predetermined parts of said memory means, and plural means for inhibiting said buffer memories from transferring output signals from said memory means while an associated part of said memory means is in said write-in state.

3. A phase locking system as claimed in claim 1, wherein said first resetting means resets said first addressing means every $4n$ fields, where $n$ is a positive integer.

4. A phase locking system as claimed in claim 3, wherein said composite video signal is an NTSC composite video signal, and $n$ equals 1.

5. A phase locking system as claimed in claim 4, wherein said composite video signal is a PAL composite video signal, and $n$ equals 2.

6. A phase locking system as claimed in claim 1, wherein said controlling means comprises a second addressing means for defining a position in said memory means from which said stored digitalized video signal is read out, and second resetting means for resetting the state of said second addressing means to a predetermined initial condition.

7. A phase locking system as claimed in claim 6 further comprising means for producing a flag signal representing said first phase relationsip in each field, said flag signal being stored in said memory means.

8. A phase locking system as claimed in claim 7, further comprising means for reading out the stored flag signal, means for producing a reference flag signal from said second synchronizing signals, and means for comparing the read-out flag signal with said reference flag signal to define the timing for resetting by said second resetting means.

9. A phase locking system as claimed in claim 1, wherein said composite video signal includes field insertion signals in said vertical blanking period of said composite video signal, said field insertion signals in adjacent fields being different from one another, and said memory means comprises a plurality of first memory areas for respectively storing said field insertion signals for the different fields.

10. A phase locking system as claimed in claim 9, wherein said memory means further comprises a second memory areas for storing said digitalized video signal other than for the vertical blanking period of said composite video signal.

11. In combination in a video phase locking system for phase locking at least one incoming, first, composite NTSC video signal including video information and first synchronization signals including horizontal and vertical signals and a color subcarrier, to second, reference, NTSC synchronization signals, said system including memory means for storing one field of the incoming video information, inputting clock addressing and encoding means responsive to the first synchronizing signals for digitally encoding said incoming video information and storing said information in said memory means, outputting clock and addressing means responsive to the second, reference synchronizing signals for reading out said digitally quantized video signal on a frame-by-frame basis from said memory means, said inputting clock, addressing snd encoding means including means for storing a flag signal marking the place of each stored incoming video signal frame on a repeating sequence basis, and wherein said outputting clock and addressing means includes means for generating a flag signal characterizing outputting frames on a repeating sequence basis, and means responsive to the values of a read-out stored flag and of an outputting frame flag signal for selectively skipping storage locations in said memory means during memory interrogation.

12. A combination as in claim 11 wherein said stored frame and video outputting frame flag signals are of modulo-4 form.

13. A combination as in claim 11 further comprising buffer memory means coupled to the output of said memory means.

* * * * *